US006922255B1

(12) United States Patent
Tomida

(10) Patent No.: US 6,922,255 B1
(45) Date of Patent: Jul. 26, 2005

(54) INTERNET FACSIMILE DEVICE

(75) Inventor: Wataru Tomida, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/236,552

(22) Filed: Jan. 26, 1999

(30) Foreign Application Priority Data

Jan. 26, 1998 (JP) .......................................... 10-027779

(51) Int. Cl.[7] .......................... G06F 15/00; G06F 15/16
(52) U.S. Cl. ...................... 358/1.15; 358/402; 358/403; 358/407; 709/207
(58) Field of Search .............................. 358/1.15, 1.16, 358/1.18, 402, 403, 407, 438, 440, 442, 468; 382/176, 179, 181; 709/204, 206, 207

(56) References Cited

U.S. PATENT DOCUMENTS

| | | | | | |
|---|---|---|---|---|---|
| 5,155,601 A | * | 10/1992 | Toyama | ...................... | 358/401 |
| 5,247,591 A | * | 9/1993 | Baran | .......................... | 382/179 |
| 5,293,250 A | * | 3/1994 | Okumura et al. | ........... | 358/402 |
| 5,465,167 A | * | 11/1995 | Cooper et al. | .............. | 358/468 |
| 5,765,178 A | * | 6/1998 | Tanaka | ........................ | 707/526 |
| 5,796,394 A | * | 8/1998 | Wicks et al. | .................. | 345/751 |
| 5,805,298 A | * | 9/1998 | Ho et al. | ..................... | 358/402 |
| 5,838,685 A | * | 11/1998 | Hochman | ................... | 370/428 |
| 5,881,233 A | * | 3/1999 | Toyoda et al. | .............. | 709/233 |
| 5,948,058 A | * | 9/1999 | Kudoh et al. | ................ | 709/206 |
| 5,978,837 A | * | 11/1999 | Foladare et al. | ............ | 709/207 |
| 6,023,700 A | * | 2/2000 | Owens et al. | ................. | 707/10 |
| 6,025,931 A | * | 2/2000 | Bloomfield | .................. | 358/402 |
| 6,052,442 A | * | 4/2000 | Cooper et al. | ........... | 379/88.19 |
| 6,061,718 A | * | 5/2000 | Nelson | ........................ | 709/206 |
| 6,094,477 A | * | 7/2000 | Nada et al. | .............. | 379/93.24 |
| 6,147,977 A | * | 11/2000 | Thro et al. | .................... | 370/265 |
| 6,182,118 B1 | * | 1/2001 | Finney et al. | ................ | 709/206 |
| 6,185,603 B1 | * | 2/2001 | Henderson et al. | ......... | 709/206 |
| 6,211,972 B1 | * | 4/2001 | Okutomi et al. | ............ | 358/402 |
| 6,212,535 B1 | * | 4/2001 | Weikart et al. | ............. | 707/513 |
| 6,384,927 B1 | * | 5/2002 | Mori | ........................ | 358/1.15 |
| 6,430,272 B1 | * | 8/2002 | Maruyama et al. | ...... | 379/88.22 |
| 6,618,160 B1 | * | 9/2003 | Kato | ........................ | 358/1.14 |
| 6,633,630 B1 | * | 10/2003 | Owens et al. | ............ | 379/93.24 |

FOREIGN PATENT DOCUMENTS

| | | | | |
|---|---|---|---|---|
| JP | A-6-149692 | 5/1994 | | |
| JP | A-8-242326 | 9/1996 | | |
| JP | A-8-274924 | 10/1996 | | |
| JP | A-9-46372 | 2/1997 | | |
| JP | A-9-149189 | 6/1997 | | |
| WO | WO-97/10668 A1 | * | 3/1997 | ............ H04N/1/00 |

* cited by examiner

Primary Examiner—Joseph R. Pokrzywa
(74) Attorney, Agent, or Firm—Oliff & Berridge, PLC

(57) ABSTRACT

A facsimile can be transmitted via both the internet and the public network. An image is read from an original document, and image data is generated. The image data is converted into facsimile data, and further corded into e-mail data. The e-mail data is transmitted as a facsimile along with a header via the internet. The header includes a title elected by a user. When a receiving party receives the facsimile via the internet, the receiving party can obtain the general contents of the facsimile and determine its urgency from the title.

6 Claims, 15 Drawing Sheets

| COMMENT 1 | YOU HAVE A FAX |
| COMMENT 2 | FAX: ASAP |
| COMMENT 3 | FAX: PLEASE CALL |
| COMMENT 4 | FAX: CONFIDENTIAL |
| COMMENT 5 | |
| COMMENT 6 | |
| COMMENT 7 | |
| COMMENT 8 | |
| COMMENT 9 | |
| COMMENT 10 | |

FIG. 3(c)

INTERNET FACSIMILE DEVICE

BACKGROUND OF THE INVENTION

1. Field of the Invention

The present invention relates to an internet facsimile device capable of transmitting and receiving a facsimile via the internet.

2. Description of the Prior Art

Due to the expanded use of the internet in recent years, Japanese Patent-Application Publication (Kokai) Nos. HEI-8-242326 and HEI-9-149189 have proposed internet facsimile devices that can transmit and receive a facsimile via the internet.

According to the internet facsimile device proposed in Japanese Patent-Application Publication (Kokai) No. HEI-8-242326, an image is read from an original document by an image scanner, and facsimile data is generated and temporarily stored. Subsequently, the facsimile data is converted to electronic-mail (e-mail) data and transmitted along with a header to a receiving party via the internet. The header includes a destination address, a source address, and information on its data format and conversion method in which the e-mail data is converted to a character code. The e-mail data received by a receiving party is converted back to the facsimile data and output to a printer so as to be printed out.

In these conventional internet facsimile devices, upon receiving a facsimile, a receiving party can know a sending party of the facsimile. However, the receiving party cannot know what type of facsimile has been received, for example, whether or not it is in urgent.

SUMMARY OF THE INVENTION

In view of the foregoing, it is an object of the present invention to provide an internet facsimile device in which a receiving party can determine general contents and urgency of a received facsimile in a simple manner.

It is another object of the present invention to enable the receiving party to immediately output urgent facsimiles.

In order to achieve the above and other objectives, there is provided an internet facsimile device including a destination specifying means for specifying an electronic mail address of a destination, first data generation means for generating image data by reading an image from an original document, second data generation means for generating electronic mail data based on the image data, internet facsimile transmitting means for transmitting the electronic mail data via an internet to the electronic mail address specified by the destination specifying means, and title inputting means for inputting a title for the electronic mail data, wherein the internet facsimile transmitting means comprises title attaching means for attaching the title as an electronic mail title to the electronic mail data before the electronic mail data is transmitted.

There is also provided an internet facsimile device including destination specifying means for specifying one of a facsimile number and an electronic mail address as a destination, first data generating means for generating image data by reading an image from an original document, second data generating means for generating facsimile data based on the image data, third data generating means for generating electronic mail data based on the facsimile data, first facsimile transmitting means for transmitting the facsimile data via a public network to the facsimile number when the facsimile number has been specified as the destination, second facsimile transmitting means for transmitting the electronic mail via an internet to the electronic mail address when the electronic mail address has been specified as the destination, and title inputting means for inputting a title for the electronic mail data when the electronic mail address has been specified as the destination, wherein the second facsimile transmitting means comprises title attaching means for attaching the title to the electronic mail data before the electronic mail data is transmitted.

There is also provided an internet facsimile device including first receiving means for receiving via an internet at least one set of electronic mail data attached with an electronic mail title, title reading means for reading the electronic mail title, title displaying means for displaying the electronic mail title, data selecting means for selecting electronic mail data from the at least one set of the electronic mail data based on the electronic mail title, and image forming means for forming an image based on electronic mail data selected by the data selecting means.

Further, there is provided a method of controlling an internet facsimile device, including the steps of specifying an electronic mail address of a destination, generating image data by reading an image from an original document, generating electronic mail data based on the image data, specifying a title for the electronic mail data, attaching the title as an electronic mail title to the electronic mail data, and transmitting the electronic mail data attached with the electronic mail title via an internet to the electronic mail address.

Still further, there is provided a method of controlling an internet facsimile device, including the steps of receiving electronic mail attached with a header from a remote internet facsimile device, the header including a title, reading the title from the header, displaying the title, forming an image based on the electronic mail when requested by a user.

BRIEF DESCRIPTION OF THE DRAWINGS

In the drawings:

FIG. 3(c) is an explanatory diagram showing a title storage area of the RAM;

DETAILED DESCRIPTION OF THE PREFERRED EMBODIMENTS

An internet facsimile device according to preferred embodiments of the present invention will be described while referring to the accompanying drawings.

First, an overall construction of a facsimile communication system according to the embodiments of the present invention will be described.

Figure 1:
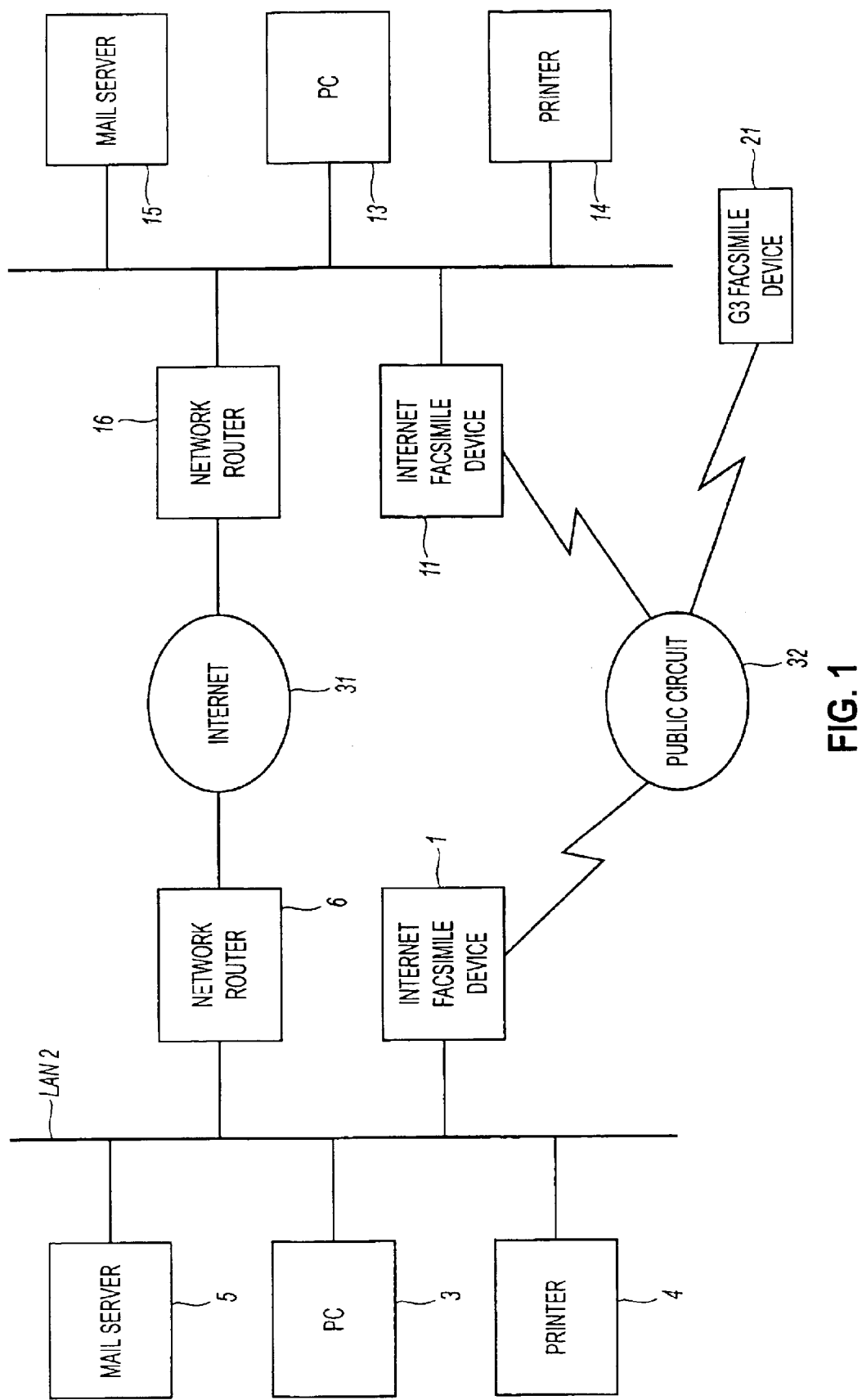
FIG. 1 is a block diagram showing an overall configuration of an internet facsimile system according to embodiments of the present invention.

As shown in FIG. 1, an internet facsimile device 1, an Internal facsimile device 11 which has the same configuration as that of the internet facsimile device 1, and a G3 facsimile device 21 are connected each other via a public network 32. In this embodiment, the internet facsimile device 1 serves as a transmission terminal, and the Internal facsimile device 11 and the G3 facsimile device serve as reception terminals. The internet facsimile device 1 is connected via a local area network (LAN) 2 to an in-house personal computer 3, a printer 4, a mail server 5, and a network router 6. In the same way, the internet facsimile device 11 is connected via a LAN 12 to an in-house personal computer 13, a printer 14, a mail server 15, and a network router 16. The network router 6 and the network router 16 are connected each other via an internet 31. With this configuration, a facsimile can be transmitted and received between the internet facsimile device 1 and the internet facsimile device 11 via the public network 32, and also via the internet 31.

Figure 2:
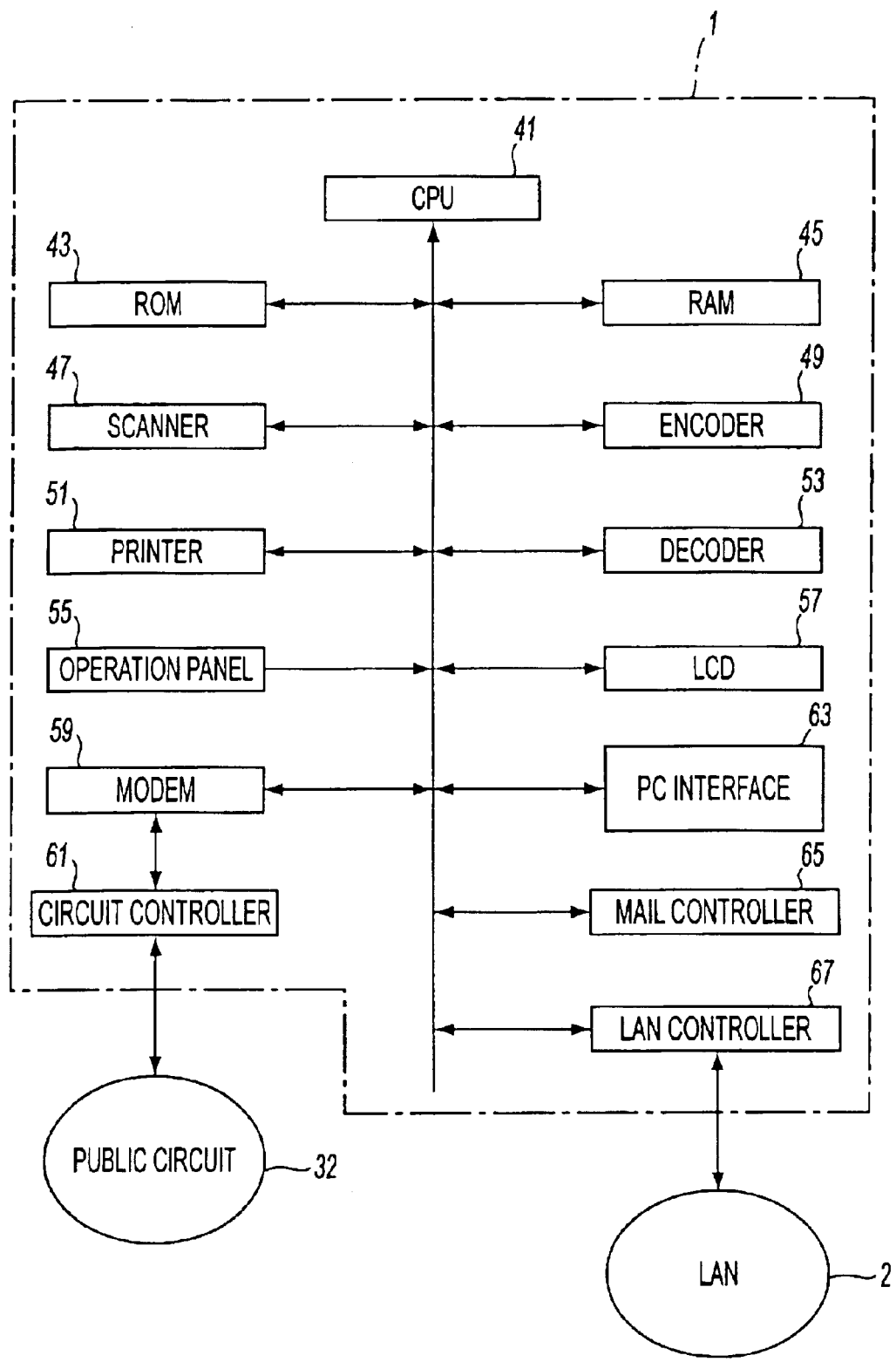
FIG. 2 is a block diagram showing an overall configuration of an internet facsimile device according to the embodiments of the present invention.

Next, a configuration of the internal facsimile device 1 will be described with reference to FIGS. 2 to 3(c). It should be noted that because the internet facsimile device 1 and the internet facsimile device 11 of the present embodiments have the same configuration, an explanation on a configuration of the internal facsimile device 11 will be omitted for avoiding duplication on explanation. As shown in FIG. 2, the internet facsimile device 1 includes a central processing unit (CPU) 41, a read only memory (ROM) 43, a random access memory (RAM) 45, a scanner 47, an encoder 49, a printer 51, a decoder 53, an operation panel 55, a liquid crystal display (LCD) 57, a modem 59, a circuit controller 61, a personal computer interface (PC interface) 63, a mail controller 65, and a LAN controller 67. The circuit controller 61 is connected to the modem 59 and further to the public network 32. The LAN controller 67 is connected to the LAN 2.

Figures 3A, 3B:
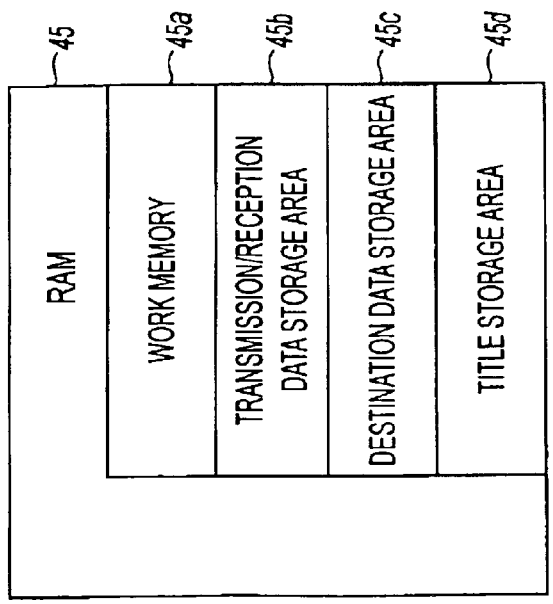
FIG. 3(a) is an explanatory diagram showing a RAM of the internet facsimile device of FIG. 2.
FIG. 3(b) is an explanatory diagram showing a destination data storage area of the RAM of FIG. 3(a)

The CPU 41 executes an overall control of the internet facsimile device 1, and executes various control processes, such as transmission and reception of a facsimile, registering destination addresses, registering titles, and the like, according to control programs stored in the ROM 43. Programs and data necessary for these control processes are prestored in the ROM 43. As shown in FIG. 3(a), the RAM 45 includes a work memory 45a, a transmission/reception data storage area 45b for use in facsimile transmission and reception control, a destination data storage area 45c, and a title recording area 45d. The scanner 47 is for reading an image from an original document at facsimile transmission. The encoder 49 is for encoding image data into G3 compressed image data as facsimile data. The decoder 53 is for decoding facsimile data into image data. The printer 51 is for forming an image on a recording sheet based on image data decoded by the decoder 53. An operator performs input operations on the operation panel 55 for registering destination addresses, specifying destinations, inputting or selecting titles, and the like. The LCD 57 is for displaying various messages, such as operational procedures and error messages. The LCD 57 also functions as a touch panel by displaying one-touch keys at such operations as registering addresses and other information on receiving parties.

The modem 59 is for performing facsimile transmissions and receptions between the public network 32 via the circuit controller 61. The circuit controller 61 is for transmitting dial signals for the public network 32 and responding to call signals from the public network 32. The PC interface 63 is for connecting with a personal computer.

The mail controller 65 is for converting facsimile data into e-mail data so that a facsimile can be transmitted as an e-mail via the internet 31. More specifically, the mail controller 65 converts binary image data, that is, facsimile data, into text coded image data, that is, e-mail data, and attaches a header to the e-mail data. The header includes a mail address of a reception party and the like. Also, the mail controller 65 converts e-mail data received via the internet 31 back into facsimile data. Thus converted facsimile data is, then, decoded by the decoder 53 and output to the printer 51 so as to be printed out on a recording sheet.

The LAN controller 67 is for controlling input and output of e-mail data between the LAN 2 and the internet facsimile device 1.

According to the present embodiments, as shown in FIG. 3(b), the destination data storage area 45c of the RAM 45 stores destination data. The destination data includes names of receiving parties and corresponding facsimile number and e-mail addresses. That is, when a receiving party is capable of receiving a facsimile both via the public network 32 and the internet 31, both a facsimile number and an e-mail address can be stored under single name of the receiving party.

As shown in FIG. 3(c), the title recording area 45d includes a default title area 45e and a user's area 45f. In the present embodiment, four default titles, that is, "You have a facsimile", "Facsimile: ASAP!", "Facsimile: please call", and "Facsimile: confidental", are prestored in the default title area 45e. On the other hand, a user can register desired titles in the user's area 45f.

Next, control processes performed in the internet facsimile device 1 will be described. The control processes includes a destination data registration process, a title registration process, a facsimile transmission process, and a facsimile receiving process.

Figure 4:
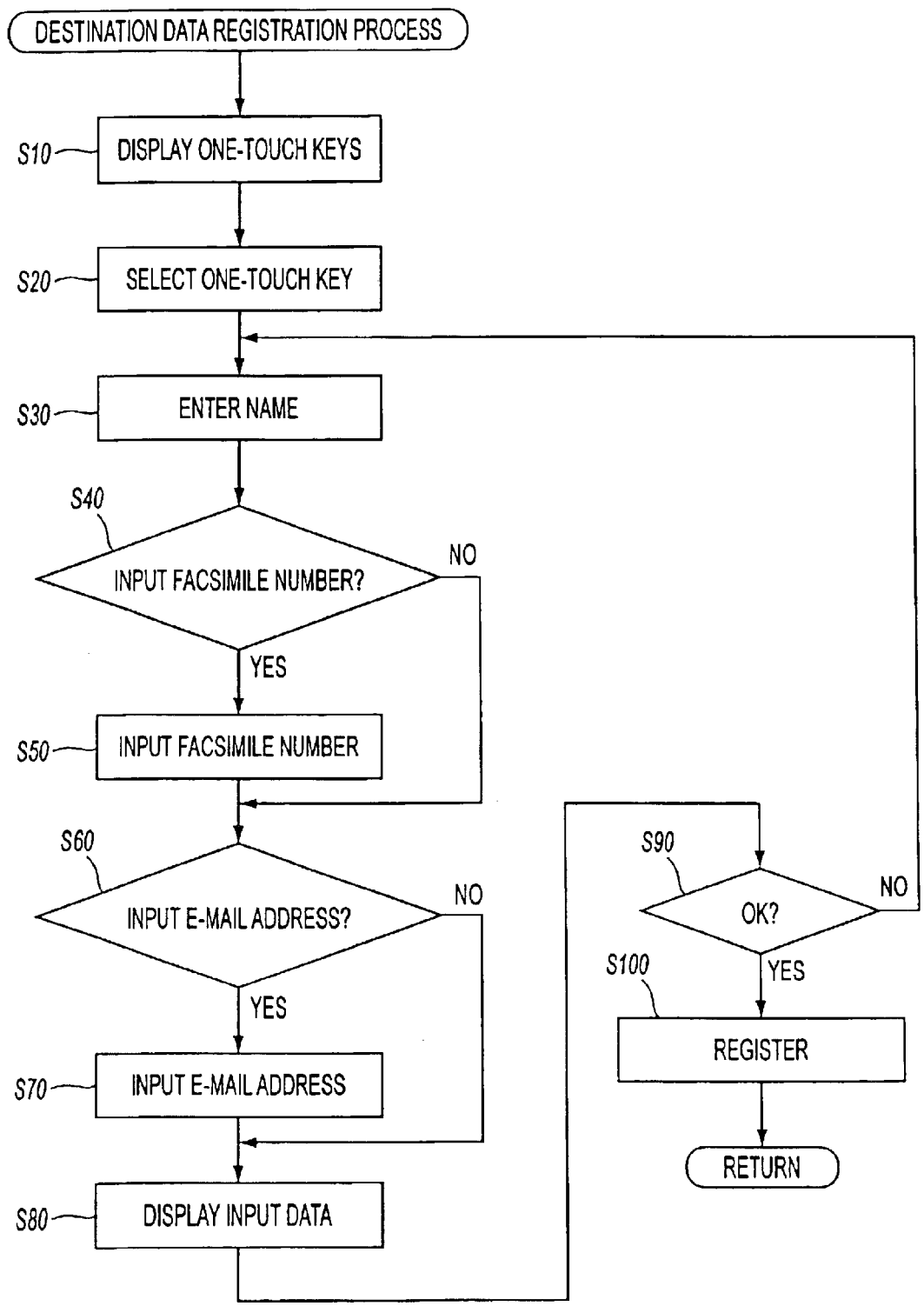
FIG. 4 is a flowchart representing a destination data registration routine executed in the internet facsimile device.

First, the destination data registration process will be described while referring to the flowchart shown in FIG. 4. The destination data registration routine is executed when required by a user operating the operation panel 55.

When the process begins, one-touch keys for a first destination to n-th destination are displayed in the LCD 57 in S10. It should be noted that if the LCD 57 is not large enough to display all of the one-touch keys at one time, the user can control to scroll up and down by operating scroll keys provided to the operation panel 55.

Next in S20, the user selects one of the one-touch keys displayed in the LCD 57. Then, in S30, the user enters a name of a receiving party. If the receiving party has a facsimile number (YES:S40), then in S50, the user inputs the facsimile number, and the process proceeds to S60. On the other hand, if the receiving party does not have a facsimile number (NO:S40), the process directly proceeds to S60 without executing the process of S50. Then, if the receiving party has an e-mail address (YES:S60), then the user enters the e-mail address in S70, and the process proceeds to S80. On the other hand, if the receiving party does not have an e-mail address (NO:S60), the process directly proceeds to S80 without S70. Hence, the user has to input at least one of a facsimile data and an e-mail address of a receiving party. That is, the user has to input a) only a facsimile number, b) only an e-mail address, or c) both a facsimile number and an e-mail address, in the processes of S40 to S70.

Then, in S80, the LCD 57 displays data inputted by the user in the previous processes, and the user is prompted, in S90, to indicate whether or not the displayed data should be registered. If the user indicates that the data should be registered (YES:S90), then in S100, the data is registered and stored in the destination data storage area 45c, and the present process is ended. On the other hand, if not (NO:S90), then the process returns to S30, enabling the user to re-enter a name and other data.

Figure 5:
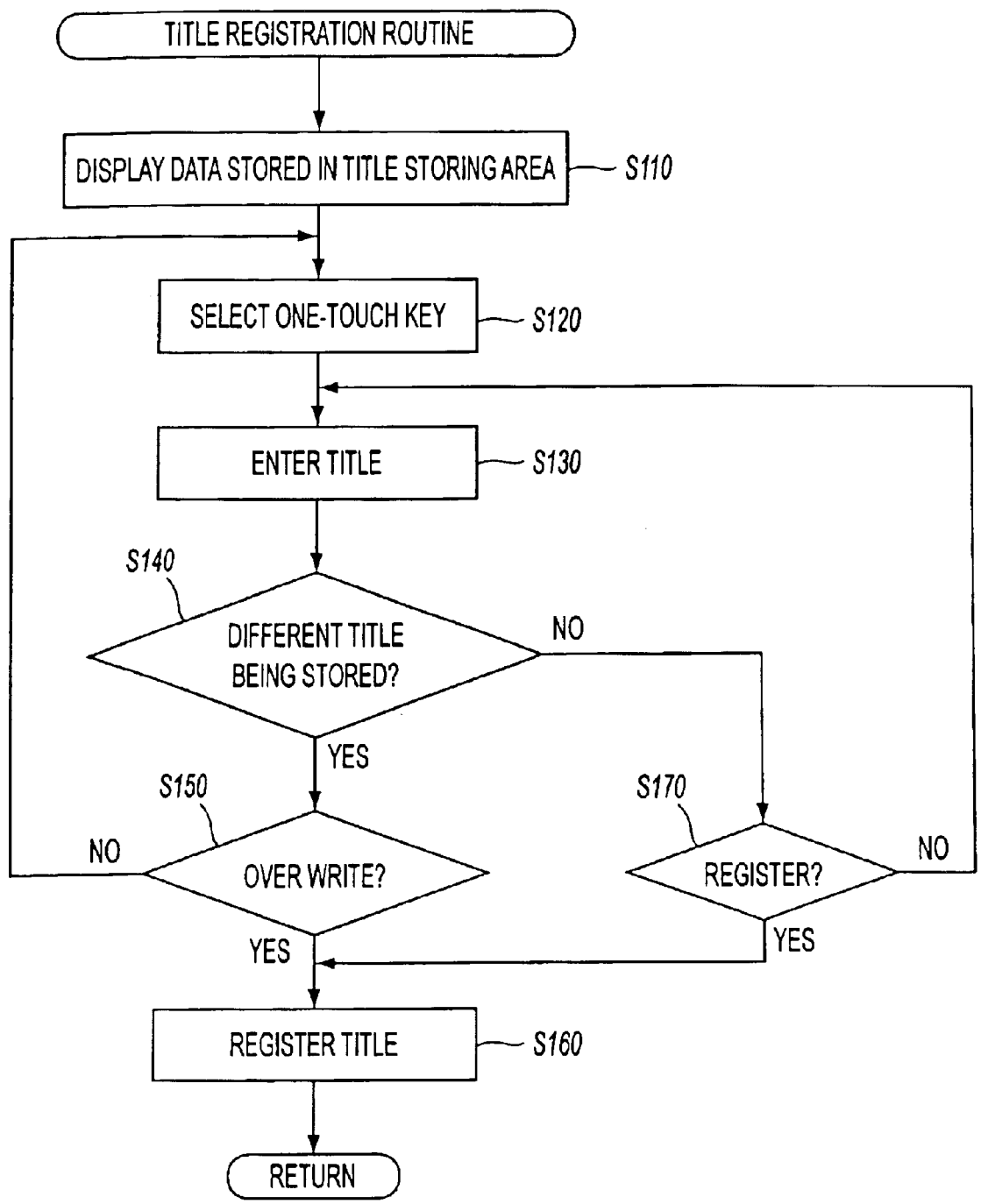
FIG. 5 is a flowchart representing a title registration routine.

Next, the title registration process for registering titles will be described while referring to the flowchart shown in FIG. 5. The title is attached to e-mail data to be transmitted as a facsimile via the internet 31. The title registration routine is executed when requires by a user operating the operation panel 55.

It should be noted that, as shown in FIG. 3(c), default titles are prestored in the default title area 45e. Therefore, titles registered during the title registration process are stored in the user's area 45f. In this embodiment, the user's area 45f can register a fifth title to a tenth title.

When the process is started, first in S110, the LCD 57 displays one-touch keys for the fifth to tenth titles, and also displays title areas displaying corresponding titles. In the state shown in FIG. 3(c), no title is presently stored in the user's area 45f. Therefore, in this case, the fifth to tenth one-touch keys are displayed along with blank title areas.

Next, the user selects, in S120, one of the one-touch keys displayed in the LCD 57, and then in S130, inputs a desired title using the operation panel 55. Next, it is determined, in S140, whether or not a different title is presently stored in associated with the selected one-touch key. If so (YES:S140), the LCD 57 displays in S150 a message, such as "Overwrite previous entry?", in order to confirm the user whether or not the user wishes to overwrite the currently-stored title. If the user indicates "yes" in S150 (YES:S150), then in S160, the new title entered in S130 is stored in association with the selected one-touch key in place of the currently stored title, and the present process is ended. On the other hand, if the user answers "no" to the above question (NO:S150), then the process returns to S120, allowing the user to reselect a different one-touch key.

On the other hand, if S120 results in a negative determination (NO:S140), then in S170, the LCD 57 displays a message in S170 prompting the user for confirmation. If the user indicates to register the input title (YES:S170), then the title is registered and stored in S160, and the present process is ended. On the other hand, if the user indicates not to register the input title (NO:S170), then the process returns to S130, allowing the user to re-enter a title.

Here, if the user wishes to delete a currently stored title, the user can press a return key in S130 without inputting a title. Then the user can indicate "yes" in S150.

As described above, according to the embodiment of the present invention, titles that the user frequently uses can be stored in the user's area 45f in association with one-touch keys. Also, the titles can be changed by being overwritten, and also new titles can be added. It should be noted that a stored title can be deleted by the user pressing a delete key after selecting a desired one-touch key.

Figure 6:
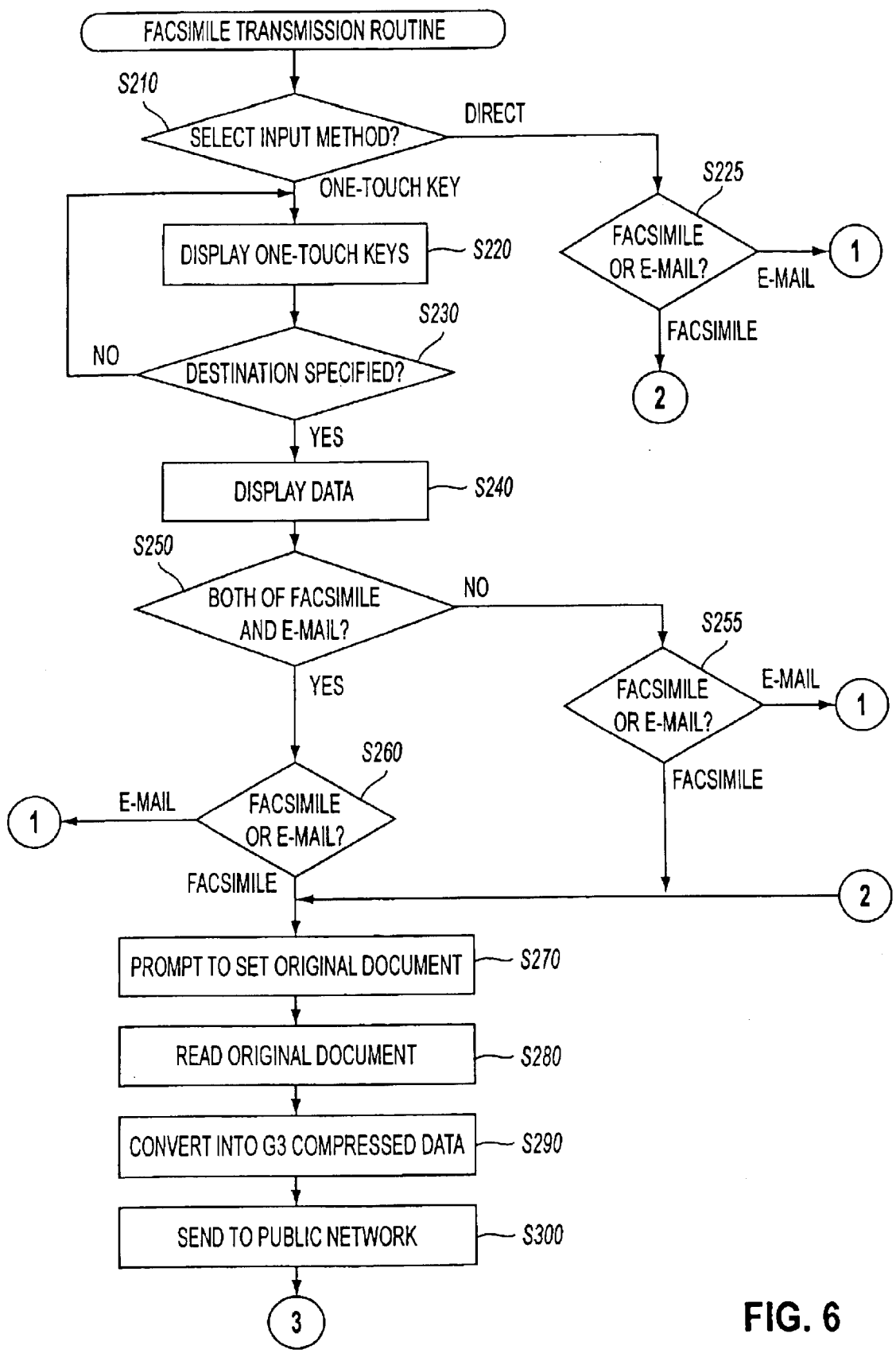
FIG. 6 is a first part of a flowchart representing a facsimile transmission routine according to a first embodiment of the present invention.
Figure 7:
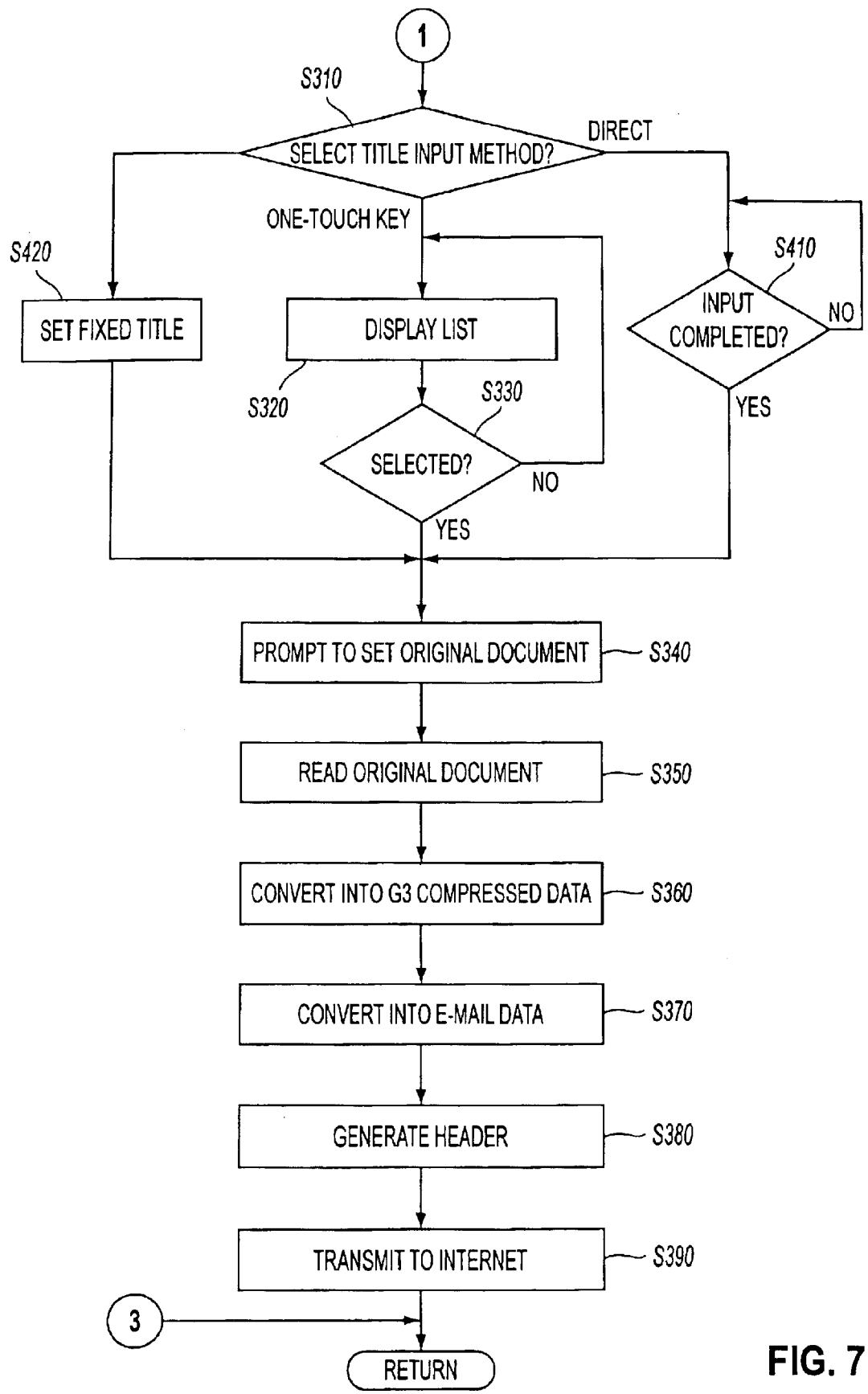
FIG. 7 is a second part of the flowchart of FIG. 6.

Next, the facsimile transmission routine will be described with reference to the flowcharts shown in FIGS. 6 and 7. The facsimile transmission routine is executed when the user instructs a facsimile transmission by operating the operation panel 55.

First, in S210, the LCD 57 displays a message inquiring the user whether the user wishes to specify a receiving party by directly inputting a destination or by using one-touch keys. If the user elects to specify by using one-touch keys (ONE-TOUCH KEY:S210), the process proceeds to S220, wherein one-touch keys corresponding to names of receiving parties are displayed based on the data stored in the destination data storage area 45c, and the CPU 41 waits for a next command.

At this time, if all of the one-touch keys are not displayed at the same time, the user can control scrolling by operating scroll keys and the like in the operation panel 55.

If the user selects a receiving party by pressing corresponding one of the one-touch keys (YES:S230), the LCD 57 displays in, S240, destination data stored in association with the selected one-touch key. At this tine, if both a facsimile number and an e-mail address of the selected receiving party are stored, the LCD 57 displays the facsimile number and the e-mail address in this order.

If both the facsimile number and the e-mail address are being stored (YES:S250), then, the program proceeds to S260, wherein the user is prompted to select either the facsimile number or the e-mail address. If the user selects the facsimile number (FACSIMILE:S260), then the user is directed, in S270, to set the original document. On the other hand, if the user selects the e-mail address (E-MAIL:S260), then the process proceeds to S310. If only one of the facsimile number and the e-mail address is being stored (NO:S250), then the CPU 41 determines in S255 which one of the facsimile number and the e-mail address is being stored. If it is determined in S255 that the facsimile number is being stored (FACSIMILE:S255), the program proceeds to S270. On the other hand, if it is determined that the e-mail address is being stored, the process proceeds to S310.

If the user set the original document in S270, then in S280, the scanner 47 reads an image from the original document, and generates image data. The encoder 49 encodes, in S290, the image data into G3 compressed image data, that is, facsimile data, and transmitted, in S300, to the G3 facsimile device 21 via the modem 59, the circuit controller 61, and the public network 32. Then, the present process is ended.

In S310, the user selects a desired title selection method. In the present embodiment, the user can select one of the following title selection methods: 1) a direct method in which the user inputs the title directly from the operation panel 55, 2) a one-touch input method in which the user selects a title using a one-touch key from the titles stored in the title recording area 45d, and 3) a fixed input method in which the user selects a fixed title such as "You have a facsimile" stored in the top area of the default title area 45e.

When the one-touch input method is selected (ONE-TOUCH:S320), the process proceeds to S3o2, wherein the LCD 57 displays a list of the titles stored in the title recording area 45d along with respective one-touch keys. The program waits in S330 for the user to select a desired title by touching a corresponding one-touch key. At this time, if the entire list cannot be displayed in the LCD 57, the user can control to scroll by operating the scroll keys and the like provided to the operation panel 55.

If the user select a desired title (YES:S330), then in S340, the user is instructed to set the original document. The scanner 47 reads, in S350, an image from the original document, and image data is generated. The image data is, then in S360, encoded into G3 compressed image data by the encoder 49. Because the G3 compressed image data cannot be transmitted via the internet 31, the G3 compressed image data is, in S370, further converted into text coded image data, that is, e-mail data, by the mail controller 65. Further in S380, the mail controller 65 creates a header which includes the selected e-mail address, the selected title, data on the sending party, data necessary for outputting a message to a printer or a viewer on a receiving terminal, and the like. Then in S390, the e-mail data attached with the header is output to the LAN controller 67 and transmitted to the internet 31 via the LAN 2 and the network router 6. Then, the present process is ended.

If the user selects the direct input method (DIRECT:S310), it is determined, in S410, whether or not the user has completed inputting a title through the operation panel 55. If so (YES:S410), the process proceeds to S340.

If the user selects the fixed input method (FIXED:310, then in S420, a fixed title, such as "You have a facsimile", is automatically selected. Then, the process proceeds to S340.

Next, the facsimile receiving process will be described while referring to the flowchart shown in FIG. 8.

The facsimile receiving process is automatically executed periodically. In S510, it is determined whether or not the mail server 15 has received any e-mail addressed to the internet facsimile device 11. If so (YES:S510), then in S520, the received e-mail data is stored into the transmission/reception data storage area 45b provided in the RAM 45. Further in S530, a title and a name of a sending party are stored as receiving report in a predetermined communication management data storage section within the transmission/reception data storage area 45b. In the present embodiment, a facsimile received via the internet 31 is not immediately output to the printer 14. Instead, mail data remains stored in the transmission/reception data storage area 45b, and the internet facsimile device 11 is kept in S540 in a standby state for waiting for a user to input a next command.

When the user inputs, in S540, a command to display the receiving report, then in S550, the LCD 57 displays the receiving report which includes the name of the sending party and the title. In S560, the internet facsimile device 11 waits for an output command from the user. The user examines the receiving report and determines which facsimile to print out, and inputs output command by, for example, selecting a facsimile by operating cursor keys provided in the operation panel 55, and then pressing an output key in the operation panel 55.

When the user inputs the output command (YES:S560), then in S570, corresponding e-mail data is read from the transmission/reception data storage area 45b. Then, in S580, the mail controller 65 converts the e-mail data back into G3 compressed image data, and further in S590, the decoder 53 decodes the G3 compressed image data into image data in a form capable of being printed. In S600, the printer 51 is driven to print the image data onto a recording sheet, and the process is ended.

As described above, the internet facsimile device of the present embodiment is capable of transmitting a facsimile via either the internet or the public network. Since a facsimile is transmitted with a title via the internet, a receiving party can determine from the title whether or not the facsimile should be printed or should be read immediately. Also, the receiving party can delay printing of a less important facsimile, such as direct mail, until a later time, or leave such facsimile not to be printed out at all. Further, the sending party can specify a title by selecting from previously recorded titles using one-touch keys, and also can use a default fixed title. Therefore, the title input process can be simplified. Moreover, by storing receiving report, the receiving party can output the receiving report as a communication management report at a later time. Therefore, facsimile communication can be managed more precisely compared with in a normal G3 facsimile device. By receiving a facsimile attached with a title, a receiving party can avoid unnecessary printing of a facsimile, and also can output an urgent facsimile more quickly.

Figure 9:
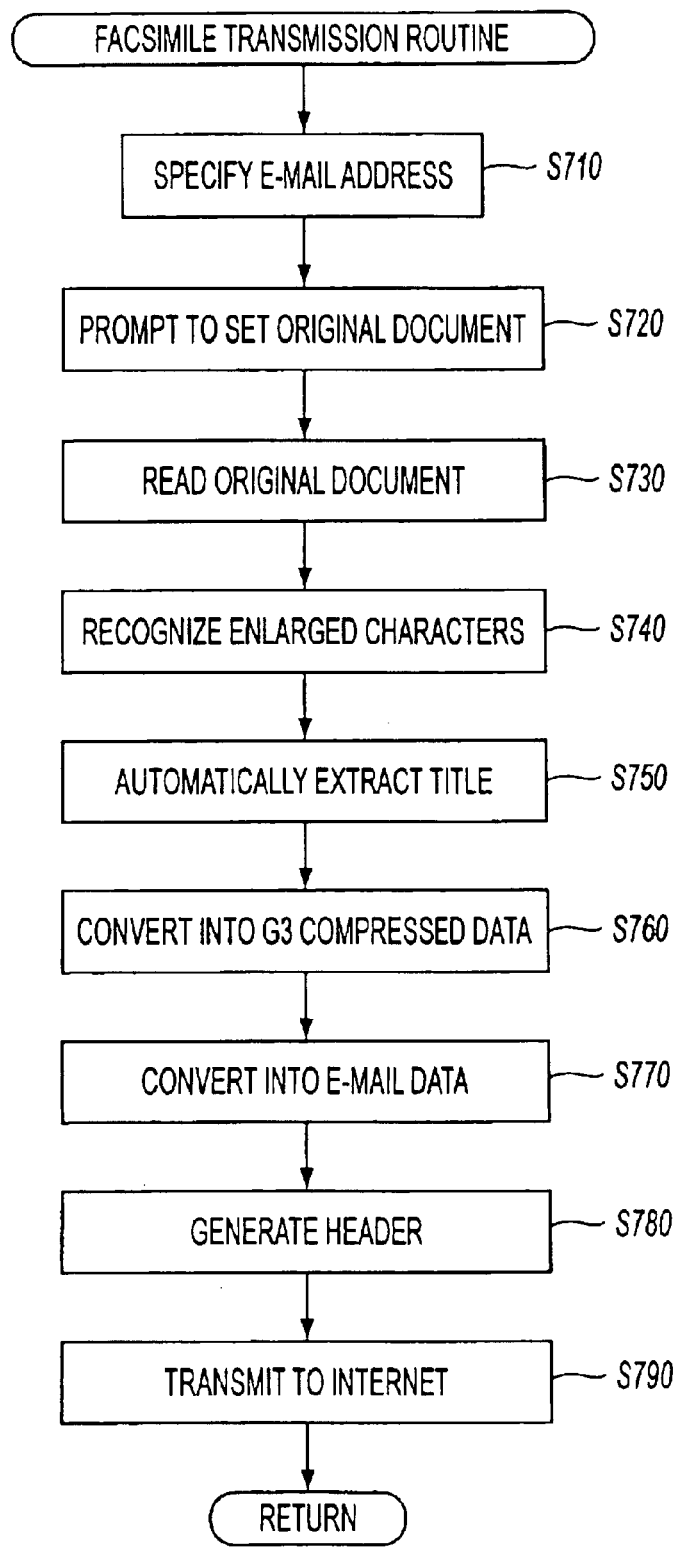
FIG. 9 is a flowchart representing a facsimile transmission routine according to a second embodiment of the present invention.

Next, a facsimile transmission process according to a second embodiment of the present invention will be described while referring to the flowchart shown in FIG. 9. The process is started when the user inputs an instruction to transmit a facsimile via the internet 31 by operating the operation panel 55.

First in S710, the user specifies an e-mail address of a receiving party by either in the direct input method or one-touch input method described above. Next, in S720, the user is prompted to set the original document, and in S730, the scanner 47 reads an image from the original document. At this time, enlarged character arrays on a first page of the original document are recognized, in S740, by an OCR function. Then, in S750, the character arrays are extracted as a title of the facsimile. The image data read from the original document is, in S760, encoded by the encoder 49 into G3 compressed image data. The G3 compressed image data is converted, in S770, by the mail controller 65 into a text coded image data, that is, e-mail data, capable of being transmitted via the internet 31. In S780, the title which has been automatically extracted in S750 is also sent to the mail controller 65, and a header is created. The header includes the title, the e-mail address of the selected receiving party, data on the sending party, and data necessary for performing print output or displaying the data in a viewer. After the header is attached to the e-mail data, the e-mail data is sent to the LAN controller 67 and, in S790, transmitted to the internet 31 via the LAN 2 and the network router 6.

According to the above-described second embodiment, because a title is automatically extracted from an original document, a sending party does not need to input a title, thereby minimizing operations placed on a user.

Figure 10:
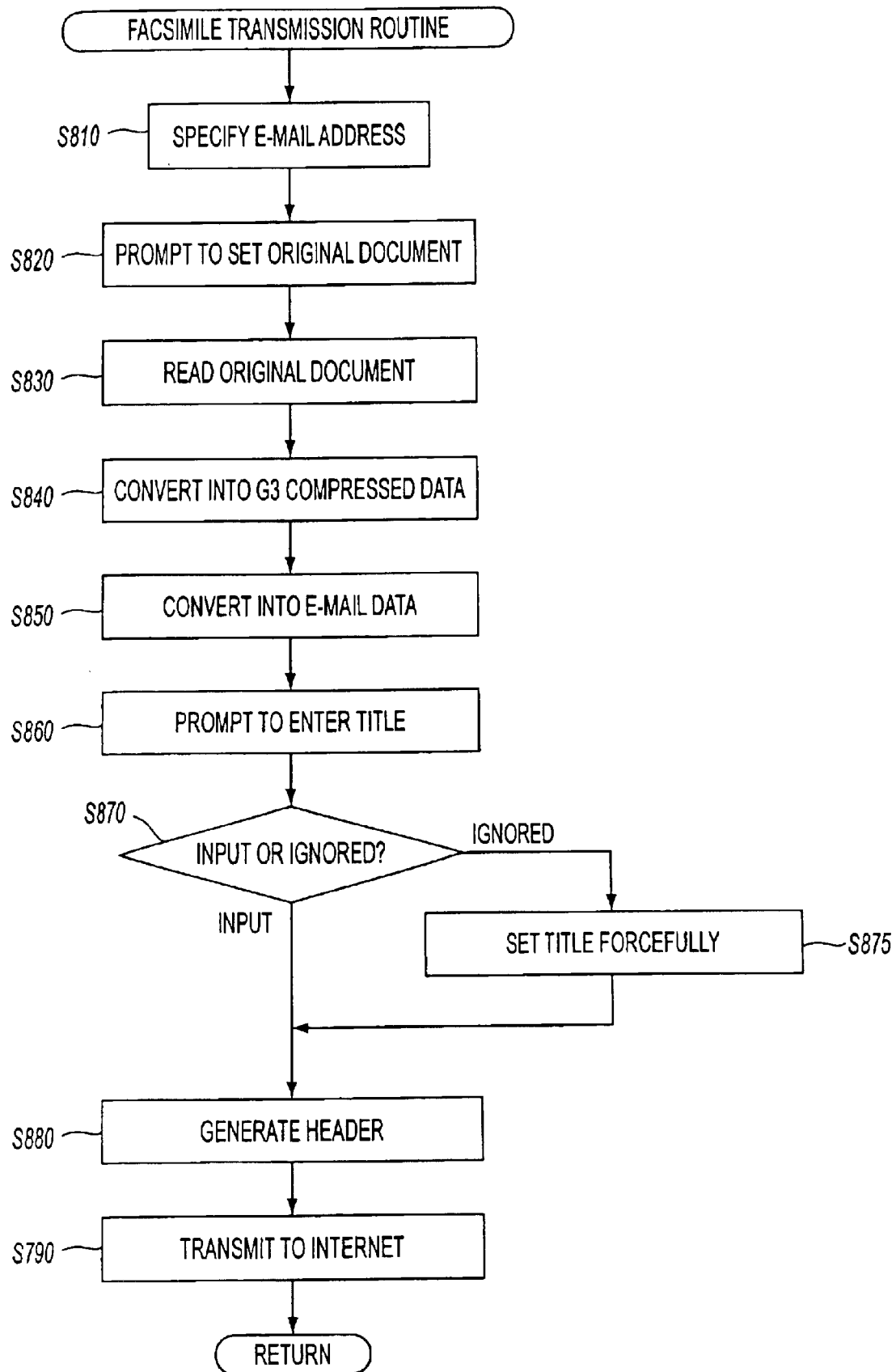
FIG. 10 is a flowchart representing a facsimile transmission routine according to a third embodiment of the present invention.

Next, a facsimile transmission process according to a third embodiment of the present invention will be described while referring to the flowchart shown in FIG. 10. The process is started when the user inputs an instruction to transmit a facsimile via the internet 31 by operating the operation panel 55.

First in S810, the user specifies an e-mail address of a receiving party in the indirect input method or the one-touch input method. Next in S820, the user sets the original document, and in S830, the scanner 47 reads an image from the original document and generates image data. Then in S840, the image data is encoded by the encoder 49 into G3 compressed image data, and further in S850, converted into text coded image data, that is, e-mail data, by the mail controller 65. The user is, in S860, prompted to input a title to be attached to the e-mail data. Same as in the first embodiment, the user can input a title in the direct input method or the one-touch input method. If the user inputs a title according to the instruction given in S860 (INPUT:S870), the inputted title is transmitted to the mail controller 65, and in S880, a header is generated. The header includes the title, the e-mail address, data on the sending party, data necessary for printing or displaying data at a receiving terminal, and the like. Then in S890, the e-mail data with the header is sent to the LAN controller 67, and transmitted as a facsimile to the internet 31 via the LAN 2 and the network router 6.

On the other hand, if the user does not input a title in S870 (IGNORED:S870), the program proceeds to S875, wherein first one of the default titles stored in the default title area 45e is forcefully set as a title. Then, the program proceeds to S880.

As described above, according to the third embodiment, a predetermined one of the default titles is automatically attached to a facsimile when the user ignores or forgets to input or select a title. Therefore, a facsimile is never transmitted via the internet without a title. In this way, a receiving party can obtain a title of any kind, thereby preventing the receiving party from overlocking an important facsimile. Also, the function of the present invention will not be wasted.

Figure 11:
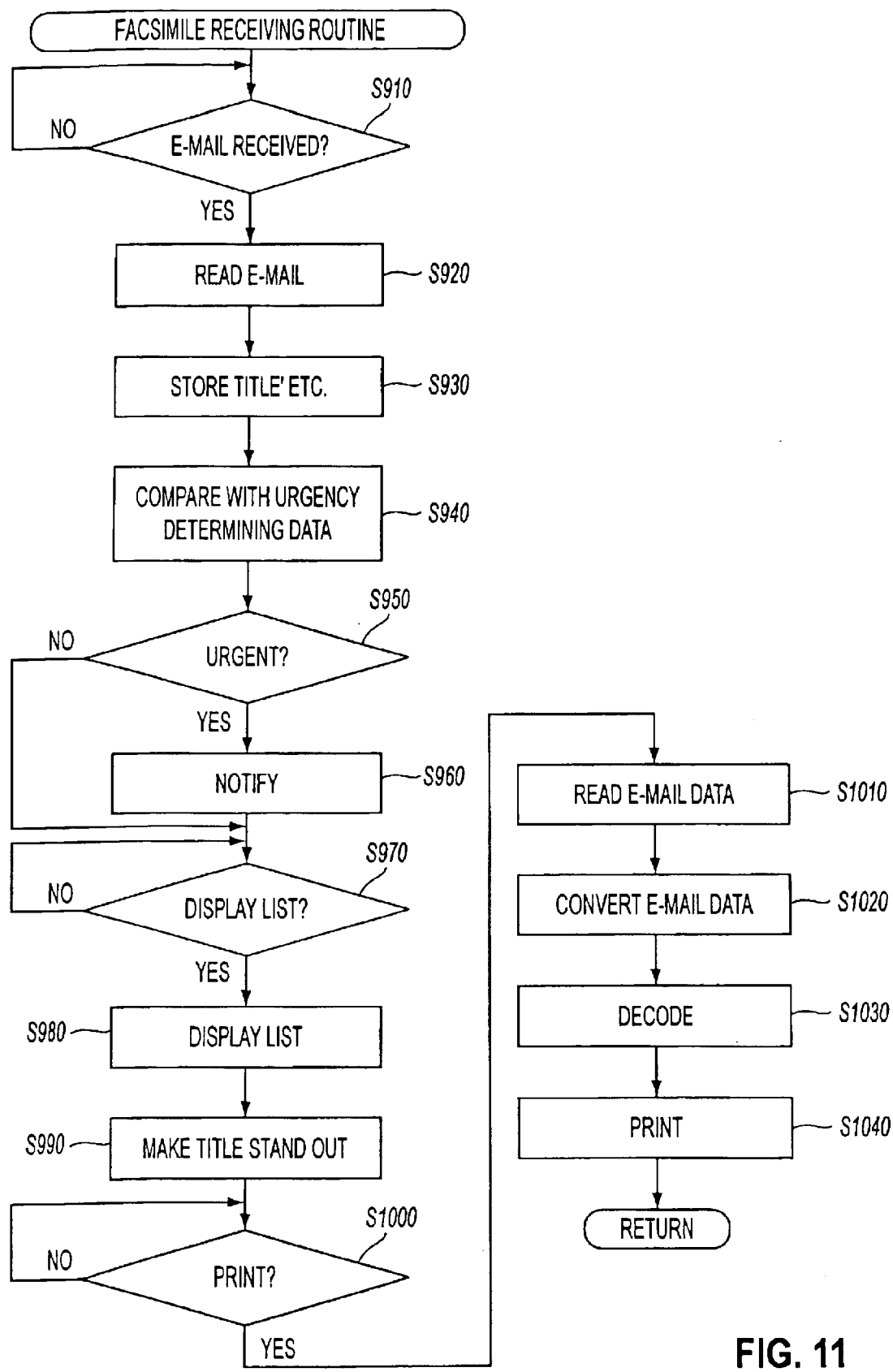
FIG. 11 is a flowchart representing a facsimile receiving routine according to a fourth embodiment of the present invention.

Next, a facsimile receiving process according to a fourth embodiment will be described while referring to the flowchart shown in FIG. 11.

The internet facsimile device 11 periodically executes process of S910 to determine whether or not the mail server 15 has received any e-mail data addressed to the internet facsimile device. If so (YES:S910), then in S920, the e-mail data is stored in the transmission/reception data storage area 45b provided in the RAM 45. Then in S930, a title and a name of a sending party included in a header attached to the e-mail data are stored as a receiving report in a predetermined communication management data storage section of the transmission/reception data storage area 45b. Next in S940, the CPU 41 checks the title against data which is prestored in the ROM 43, and determined in S950 whether or not the facsimile should be immediately printed out. For example, if the title includes such character arrays as "immediately", "important," "urgent", or "please respond", then the message is set for immediate printout.

If S950 results in an affirmative determination (YES:S950), then in S960, the receiving party is notified of the urgency by a beep or the like. On the other hand, if S950 results in a negative determination (NO:S950), the process proceeds to S970, wherein the facsimile received via the internet 31 is kept in the transmission/reception data storage area 45b, and the internet facsimile device 11 waits in a standby state for the user to input a next command.

Figure 8:
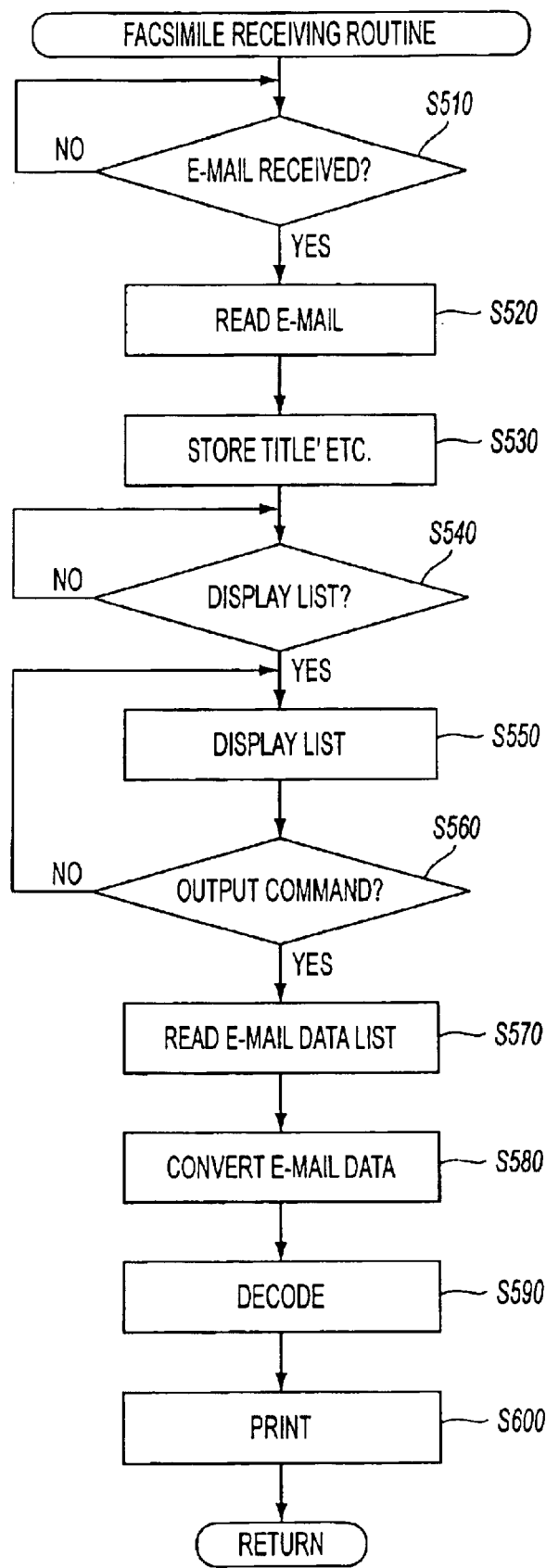
FIG. 8 is a flowchart representing a facsimile receiving routine according to the first embodiment.

The processes of S970 and the following steps are similar to that of S540 and the following steps in the flowchart shown in FIG. 8. However, when the user is notified of the arrival of an urgent facsimile in S960, and the user inputs a command to display the receiving report (YES:S970), then in S980, the LCD 57 displays the receiving report which includes the title and data on the sending party. Further in S990, the title of the urgent facsimile is displayed in a different color from other titles or made to flash so that the receiving party can easily distinguish the urgent facsimile from other facsimile.

If the user inputs an output command for a desired facsimile (YES:S1000), then in S1010, corresponding e-mail data is read from the transmission/reception data storage area 45b, and in S1020, converted into the G3 compressed image data by the mail controller 65, and further in S1030, decoded by the decoder 53. Then, in S1040, the printer 51 prints out the image data on a recording sheet.

According to the fourth embodiment described above, when an urgent facsimile is received via the internet, the internet facsimile device notifies a receiving party on this urgency. Therefore, the user can immediately print out the facsimile. In this way, urgent communication can be effectively performed. Further, by changing the display format of a title corresponding to an urgent facsimile in S990, a user can easily recognize the urgent facsimile even when a plurality of facsimile has been received.

Figure 12:
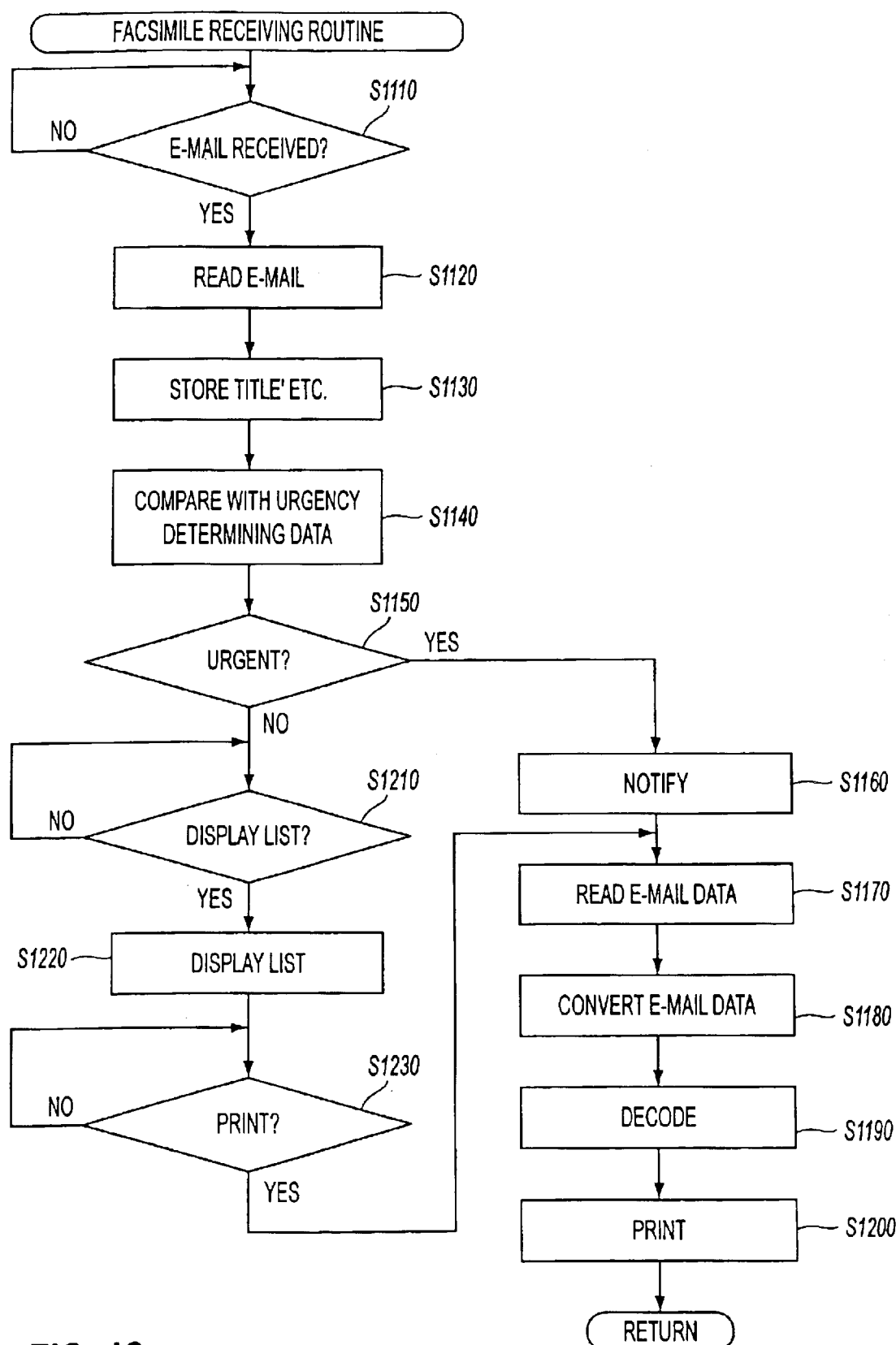
FIG. 12 is a flowchart representing a facsimile receiving routine according to a fifth embodiment of the present invention.

Next, a facsimile receiving process according to a fifth embodiment will be described while referring to the flowchart shown in FIG. 12.

The CPU 14 periodically determines, in S1110, whether or not the mail server 15 has received any e-mail addressed to the internet facsimile device 11 via the internet 31. If so (YES:S1110), then in S1120, the e-mail data is stored into the transmission/reception data storage area 45b provided in the RAM 45. Then in S1130, a title and a name of a sending party are stored as a receiving report in a prescribed communication management data storage section of the transmission/reception data storage area 45b. Next, the CPU 14 checks, in S1140, the title against data which is prestored in the ROM 43, and determines, in S11650, whether or not the facsimile is in an urgent. For example, S1150 can result in an affirmative determination if the title includes such character arrays as "immediately", "important", "urgent", "please respond", and the like.

If S1150 results in an affirmative determination (YES:S1150), then in S1160, the user is notified of that the facsimile should be urgently printed out by a beep or the like. Then in S1170, the corresponding e-mail data is immediately read from the transmission/reception data storage area 45b without waiting for an instruction from the user. The e-mail data is converted, in S1180, back to the G3 compressed image data by controller 65, and in S1190, decoded by the decoder 53, and further in S1200, printed by the printer 51 on a recording sheet.

On the other hand, S1150 results in a negative determination (NO:S1150), then the program waits for the user to input an instruction to display the receiving report in S1210. If the user inputs the instruction (YES:S1210), then the receiving report is displayed in S1220 and the program proceeds to S1230 and wait for the user to input an output command. If the user input the output command (YES:S1230), then the process proceeds to S1170.

According to the fifth embodiment described above, when an urgent facsimile is received via the internet, a receiving party is notified of its urgency. Because the facsimile is automatically printed out, the internet facsimile device can further easily and reliably handle urgent facsimile.

Figure 13:
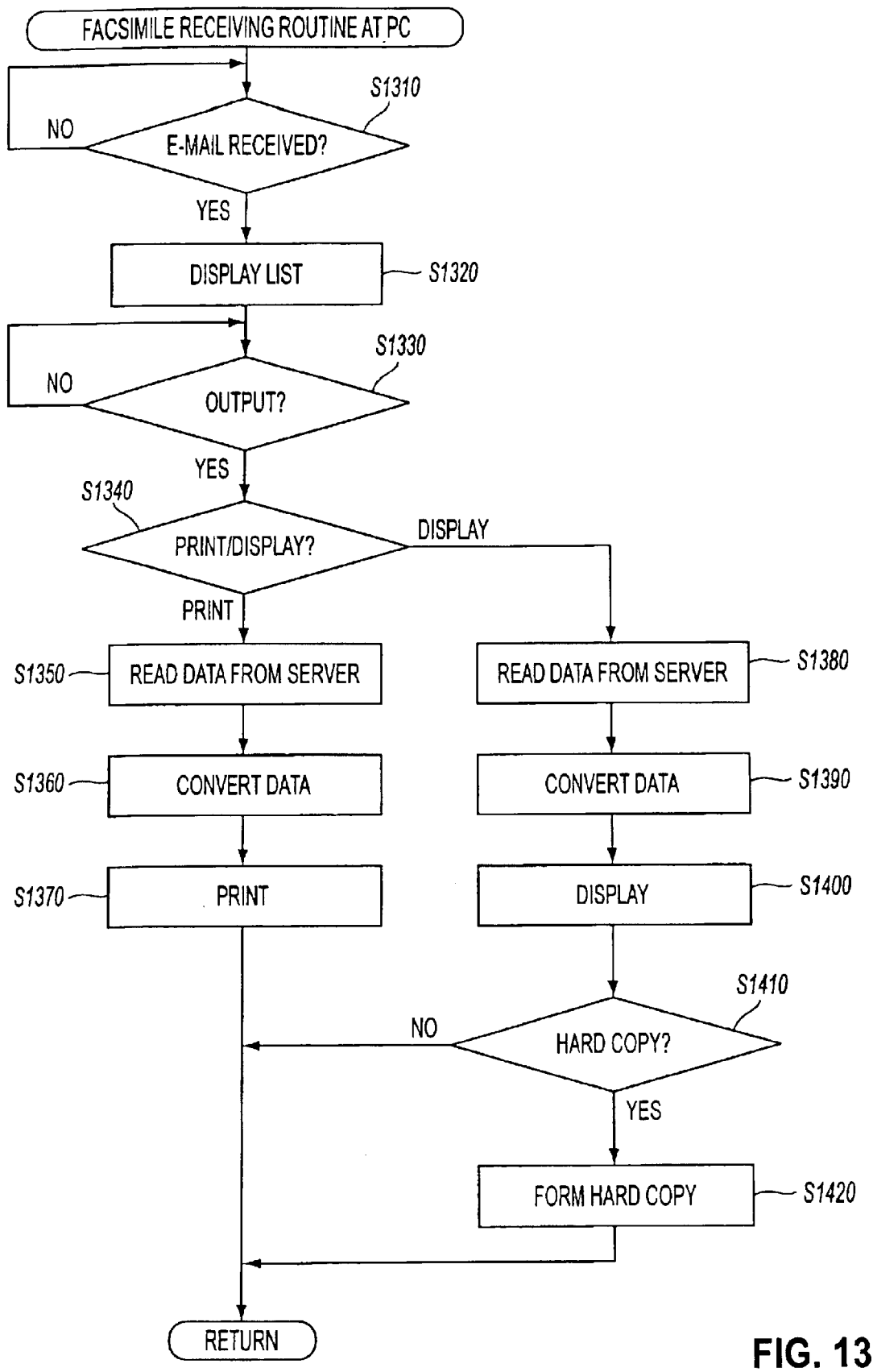
FIG. 13 is a flowchart representing facsimile receiving routine according to a sixth embodiment of the present invention.

Next, a facsimile receiving process according to a sixth embodiment will be described while referring to the flowchart shown in FIG. 13. The facsimile receiving process in this embodiment is executed by the personal computer 13 connected to the LAN 12 when a facsimile addressed to an individual at the receiving terminal is received.

In this embodiment, the personal computer 13 periodically checks, in S1310, the mail server 15 for an incoming facsimile addressed to the individual using the personal computer 13. It should be noted that the user of the personal computer 13 has to previously register a personal e-mail address on the personal computer 13 so that the personal computer 13 can check for an incoming facsimile on the mail server 15 according to the registered e-mail address.

If S1310 results in an affirmative determination (YES:S1310), then in S1320, the e-mail is displayed as a mail list on a display of the personal computer 13. As described above, since a title is attached to e-mail data, the user of the personal computer 13 can be notified of that a new facsimile has been received by examining the mail list. Moreover, since the user can obtain the general contents of the facsimile from the displayed titles, the user can easily determine whether the facsimile should be immediately printed out or displayed in the display of the personal computer 13 using a viewer function.

After displaying the mail list in the display of the personal computer 13 in S1320, the program waits, in S1330, for a next instruction from the user. If the user input an output command (YES:S1330), then in S1340, the personal computer 13 prompts the user to select whether to print out the data or to display in the display. If the user select to print out (PRINT:S1340), then in S1350 corresponding data is read from the mail server 15. Next in S1360, the data is converted to image data capable of being printed. In S1370, the image data is transmitted to the printer 14, and a printing process is executed. Then, the present process is ended.

On the other hand, if the user selects to display (DISPLAY:S1340), then in S1380, the corresponding data is read from the mail server 15, and in S1390, converted to image data capable of being displayed by a viewer function. The image data is displayed in S1400, and the program proceeds to S1410. If the user determines to obtain a hardcopy of the image data (YES:S1410), the image data is sent to the printer 14 in S1420, and a hardcopy is printed out. Then, the program is ended.

According to the embodiments described above, because the user is prompted to specify a title before transmitting a facsimile via the internet, the function of the present invention will be effectively achieved. Here, it is possible to control not to allow to perform a facsimile transmission unless a user specifies a title.

Also, image data read from an original document can be converted into facsimile data and then, into e-mail data. Therefore, if a public network is congested when a user attempts to transmit a facsimile via the public network, the facsimile can be transmitted via the internet by converting facsimile data into e-mail data without image data is read from the original document once again.

While the invention has been described in detail with reference to specific embodiments thereof, it would be apparent to those skilled in the art that many modifications and variations may be made therein without departing from the spirit of the invention, the scope of which is defined by the attached claims.

Figure 14:
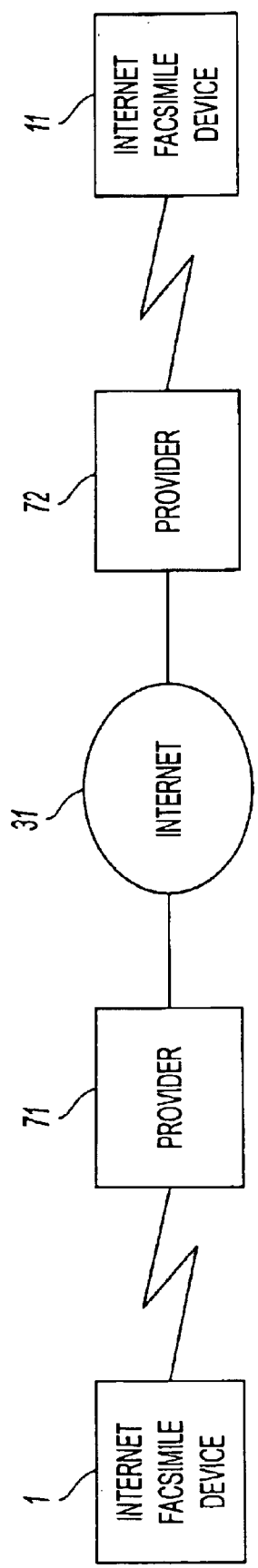
FIG. 14 a block diagram showing a facsimile communication system according to a modification of the embodiments.

For example, the embodiments described above applied the invention to a system configuration as shown in FIG. 1. However, the present invention can also be applied to a system configuration as shown in FIG. 14. In this configuration, the internet facsimile device 1 and the internet facsimile device 11 are connected to providers 71 and 72, respectively, via public networks. Facsimile transmissions and receptions are conducted via the providers 71, 72 and using the internet 31.

Further, in the embodiments described above, titles are input in the one-touch key input method. However, it is also possible to input titles by reading a bar code associated with a title from a bar code list. Further, rather than performing an enlarged character recognition as a method to automatically set a title, it is also possible to set an underlined character array as the title; to set a character array inside a prescribed area as the title; or to set the title under some other condition.

Further, when transmitting a facsimiles via the internet in the embodiments described above, image data is first converted to facsimile data and then, into e-mail data. However, the image data can be converted directly into e-mail data. Further, received e-mail data can be directly converted back into image data capable of being printed. In this case, a device including with a G3 facsimile unit and an internet facsimile unit connected in parallel in a single unit can be provided with a title inputting function of the present invention. Here, the G3 facsimile unit converts image data into G3 compressed data as facsimile data; transmits the facsimile via a public network; and prints out an image based on the facsimile data received via the public network. The internet facsimile unit converts image data directly into e-mail data; transmits the e-mail data via the internet; and directly converts received e-mail data into image data capable of being printed.

What is claimed is:

1. An internet facsimile device of a receiving party, comprising:
first receiving means for receiving by the internet facsimile device via an internet at least one set of electronic mail data attached with an electronic mail title;
title reading means for reading the electronic mail title;
title displaying means for displaying the electronic mail title that has been received along with the electronic mail data;
data selecting means for selecting electronic mail data from the at least one set of the electronic mail data based on the electronic mail title;
priority determining means for determining whether or not each one of the at least one set of electronic mail data has a high priority based on a corresponding electronic mail title; and
image forming means for forming an image based on electronic mail data selected by the data selecting means, wherein the internet facsimile device displays the received electronic mail title, and wherein the image forming means forms an image based on the electronic mail data which has been determined to have a high priority, whereby the internet facsimile device prints the image formed by the image forming means automatically without any instructions from a user; and
notifying means for notifying a user when the image forming means forms an image based on the electronic mail data which has been determined to have a high priority.

2. The internet facsimile device according to claim 1, further comprising second receiving means for receiving facsimile data via a public network, and data converting means for converting the at least one set of the electronic mail data into facsimile data, wherein the image forming means forms an image based on the facsimile data received via the public network and on the facsimile data converted from the at least one set of the electronic mail data.

3. The internet facsimile device according to claim 1, further comprising priority determining means for determining whether or not each one of the at least one set of electronic mail data has a high priority based on a corresponding electronic mail title, and notifying means for notifying the user of electronic mail data having the high priority.

4. The internet facsimile device according to claim 1, wherein the priority determining means determines that a priority is high when corresponding electronic mail title contains a predetermined character.

5. A method of controlling an internet facsimile device of a receiving party, comprising the steps of:

receiving electronic mail attached with a header by the internet facsimile device from a remote internet facsimile device, the header including a title;

reading the title from the header;

displaying the title that has been received along with the electronic mail data;

determining whether or not the electronic mail has a high priority based on a corresponding electronic mail title; and forming an image based on the electronic mail which has been determined to have a high priority, wherein the internet facsimile device displays the received electronic mail title and prints the image formed based on the electronic mail which has been determined to have a high priority automatically without any instructions from a user; and notifying a user when the image is formed based on the electronic mail data which has been determined to have a high priority.

6. The method according to claim 5, further comprising the steps of:

determining whether or not the electronic mail belongs to a predetermined group based on the title; and notifying a user of an urgent mail when the electronic mail belongs to the predetermined group.

\* \* \* \* \*